2 Sheets—Sheet 1.
M. J. CLAWSON.
Seeding-Machine.
No. 226,442. Patented April 13, 1880.
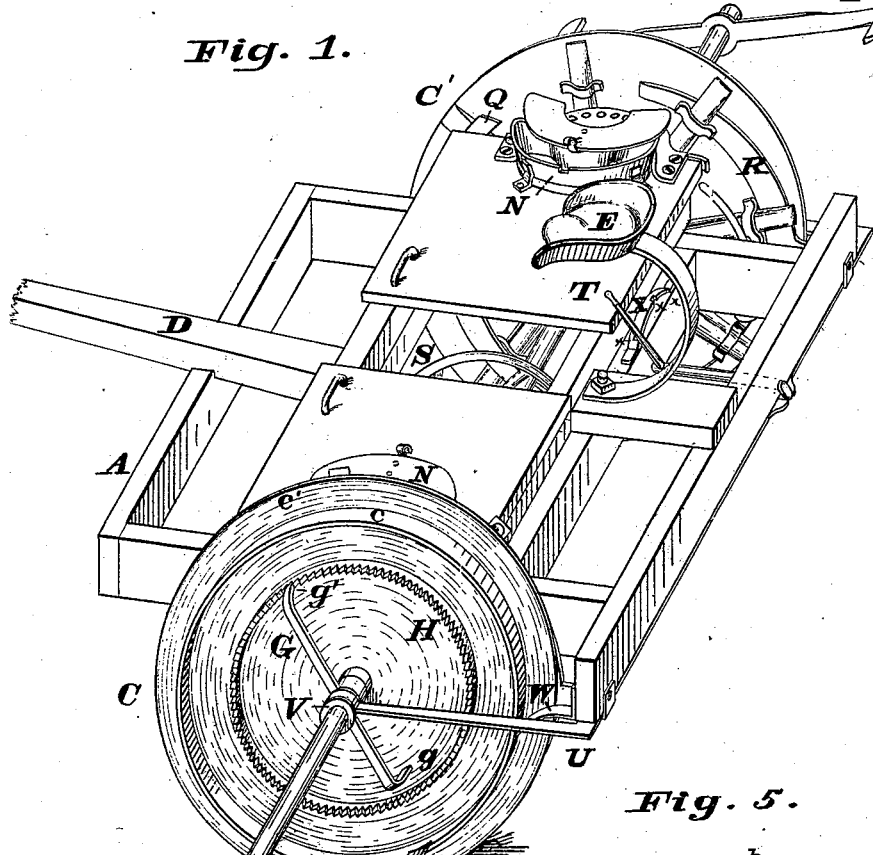
Fig. 1.
Fig. 5.
Fig. 4.
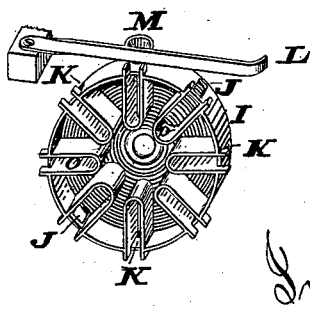
Attest.
Walter Knight
Herbert Knight
Inventor.
Milton J. Clawson
by Knight Bros.
Attys.

M. J. CLAWSON.
Seeding-Machine.
No. 226,442.   Patented April 13, 1880.
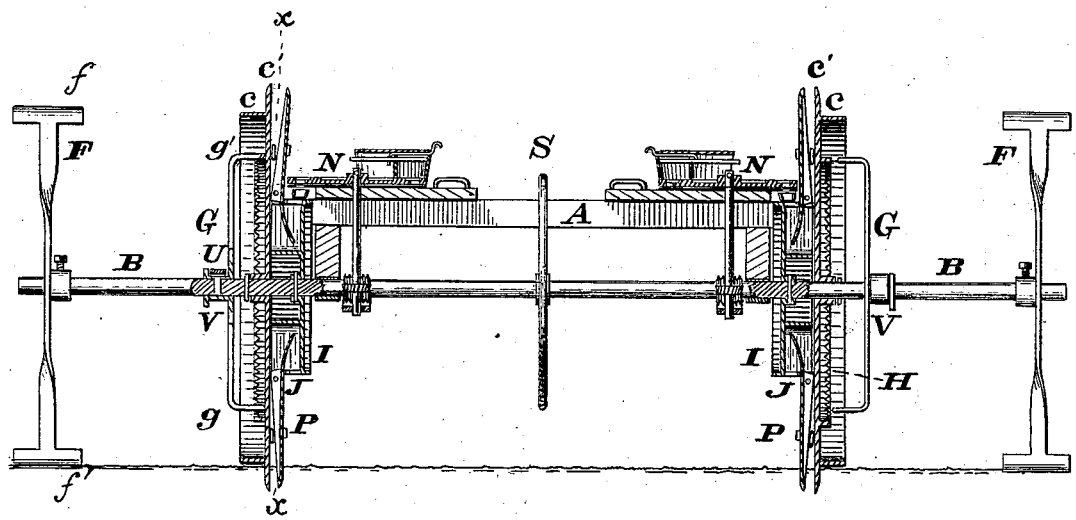
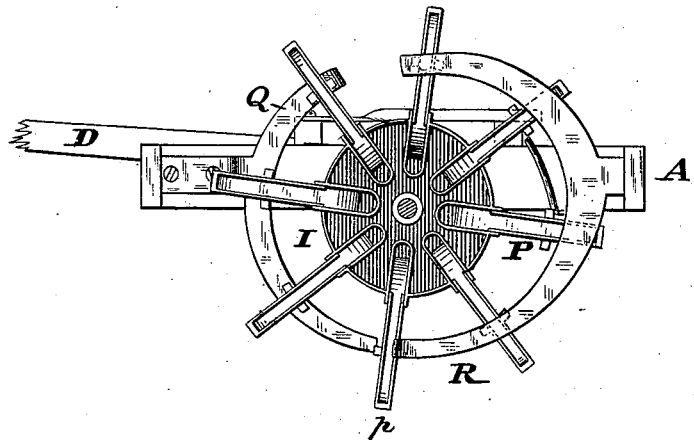

UNITED STATES PATENT OFFICE.

MILTON J. CLAWSON, OF EATON, OHIO, ASSIGNOR OF ONE-HALF OF HIS RIGHT TO LABAN FISHER, OF SAME PLACE.

SEEDING-MACHINE.

SPECIFICATION forming part of Letters Patent No. 226,442, dated April 13, 1880.

Application filed February 2, 1880.

*To all whom it may concern:*

Be it known that I, MILTON J. CLAWSON, of Eaton, Preble county, Ohio, have invented a new and useful Improvement in Seeding-Machines, of which the following is a specification.

My invention relates to improvements in those machines for planting grain whose seed-delivering mechanism is actuated by one or more ground-wheels, and which have provisions for propulsion over the ground by animal-power.

The primary object of my invention is to facilitate the planting in check-rows; but my machine is, in its most complete form, convertible at will into a grain-drill.

My invention further comprises a system of equidistant radiating and expansible grain-ducts, which serve the twofold purpose of conducting the descending seed and preparing an opening for it in the ground.

My invention further comprises a peculiarly-constructed adjustable marker.

In the accompanying drawings, Figure 1 is a perspective view of a seeding-machine embodying my improvements. Fig. 2 is an axial section of the same set for drill-planting. Fig. 3 is a section on the line $x$ $x$ of Fig. 2. Fig. 4 shows the grain-duct cylinder and shifting-lever detached. Fig. 5 is a detached representation of one of my expansible troughs of the grain-ducts.

A may represent any suitable frame; B, a shaft or axle journaled in the same, and upon which loosely revolve the two ground-wheels C C'. D may represent a suitable draft-pole, and E the driver's seat.

The ground-wheels are distanced to correspond with the desired separation of the rows, and their circumference is twice the distance from hill to hill in the row.

The axle B extends beyond each ground-wheel half the distance of the rows, and has rigidly attached to each extremity a marker, F, whose two diametrically-opposite blades, $f$ $f'$, operate in succession to indent the ground opposite each hill.

Each ground-wheel has projecting beyond its tread or periphery $c$ a flange, $c'$, which serves to furrow the ground for reception of the seed.

Rigidly attached to a clutch, V, capable of sliding upon but always rotating with the axle, and located immediately outside each ground-wheel, is a spring-pawl, G, whose heel $g$ being caused to press against the wheel side, and whose point $g'$ being at the same time caused to engage in crown-rack H on said wheel side, compels, while thus engaged, a co-rotation of the ground-wheel and of the marker, together with the latter's seed-dropping attachments.

By momentarily disengaging the pawl G $g$ $g'$ from the ground-wheel rack H the marker F and its attached seed-delivery mechanism are temporarily disengaged from the ground-wheel, and can, by turning the hand-wheel S, be adjusted forward or backward to bring the said mechanism into proper alignment or check with the previously-planted hills.

Attached to the axle at the rear of each ground-wheel is the case or drum I of the seed-delivering mechanism. This drum is pierced at its periphery with a series of equidistant orifices, of which two orifices, J, diametrically opposite to each other, are of greater width than the intervening orifices K.

A shiftable lever, L, having a funnel or conductor, M, conducts the grain from seed-distributer N either to the whole series of orifices J K or to the orifices J alone, according to whether the lever L is moved from or toward the ground-wheel. Each orifice communicates with a duct, O, having hinged to it an expansible trough, P, that terminates in a spade-edge, $p$. Each trough P is held firmly against the rear wall of ground-wheel by cam Q during that part of the rotation of the drum which commences at the uppermost and concludes at the lowermost position of such trough, at which position the trough encounters cam R, which cam operates to draw the trough away from the ground-wheel wall and permits the contents of the trough to escape into the furrow prepared for it by the said trough and the flange $c'$ of the ground-wheel.

The rounded pocket $o$ of the ducts O and the curved heel $p'$ of the troughs P coact to prevent premature escape of the grain, such as would otherwise be liable to occur on the inversion of the ducts.

A hand-wheel, S, fastened to axle B at its mid-length, and a lever, T, connected with yoke U, which is connected with clutch V, enable the operator to temporarily unclutch and shift the marker F, and to readjust it and the connected grain-drum I to true check.

A rack, X, having three notches, x, enables the operator to secure the lever T so as either to engage one of the markers with its adjacent ground-wheel or to liberate both. The engagement of the marker with one ground-wheel necessarily releasing the other, it follows that only one ground-wheel is at any time utilized to impel the seed-delivery, the other wheel revolving loosely upon the axle.

The expansible troughs P coact usefully with the wheel-flanges $c'$ to open the ground sufficiently to receive the descending seed.

A scraper, W, is provided for each ground-wheel.

Although an entire field may be planted with either ground-wheel in lock, I find it convenient to shift the lock from wheel to wheel at each return trip of the machine.

This principle of construction may obviously be extended to machines having three or more sets of seed-dropping mechanism.

I claim as new and of my invention—

1. In combination with the revolving seed-delivery I O, having the unequal orifices J and K, and with seed-distributing mechanism, the shiftable conductor P $p$ $p'$, for the purpose set forth.

2. In a seeding-machine, the axle B, journaled in the frame and having permanently attached to it two or more seed-delivering drums, I, and markers F, and hand-wheel S, and having the sliding clutch and spring-pawl V G $g$ $g'$, for engagement with a crown-rack, H, upon a loosely-revolving ground-wheel, C, substantially as set forth.

3. The described combination, in a check-row seeding-machine, of revolving axle B, permanently-attached seed-delivering drums I, markers F, and hand-wheel S, crown-rack H upon ground-wheel C, sliding clutch and spring-pawl V G $g$ $g'$, and clutch-operating mechanism T U, the whole being arranged and operating as set forth.

In testimony of which invention I hereunto set my hand.

M. J. CLAWSON.

Attest:
GEO. H. KNIGHT,
W. TYSON JUDKINS.